United States Patent
Huntsman (10) Patent No.: US 6,880,098 B1
(45) Date of Patent: Apr. 12, 2005

(54) TIMING RECOVERY IN A PACKET NETWORK USING A BUFFER

(75) Inventor: Russell E. Huntsman, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 646 days.

(21) Appl. No.: 09/949,284

(22) Filed: Sep. 7, 2001

(51) Int. Cl.[7] .............................. G06F 1/12; G06F 3/00; G06F 11/00
(52) U.S. Cl. .................... 713/400; 710/58; 370/235
(58) Field of Search .................... 713/400; 710/58; 370/232, 233, 234, 235

(56) References Cited

U.S. PATENT DOCUMENTS 5,132,964 A * 7/1992 Esaki ........................ 370/418
6,504,838 B1 * 1/2003 Kwan ....................... 370/352
6,538,995 B1 * 3/2003 Cox et al. .................. 370/232

FOREIGN PATENT DOCUMENTS

EP          987894 A2 *  3/2000 ............ H04N/7/24

* cited by examiner

*Primary Examiner*—Thomas Lee
*Assistant Examiner*—Suresh Suryawanshi (57) ABSTRACT

A packet device is disclosed for recovering timing information from packets that were transmitted over a packet network. The packet device is comprised of a buffer and a synchronization system that includes a clock. The buffer receives packets that were transmitted based on a transmitter timing signal, and fills to a target number of packets. The buffer receives a receiver timing signal from the clock, and transfers the packets based on the receiver timing signal. The synchronization system determines a measured number of the packets in the buffer at any given time. The synchronization system compares the measured number to the target number to recover timing information. The synchronization system then adjusts the second timing signal based on the timing information.

24 Claims, 5 Drawing Sheets

TIMING RECOVERY IN A PACKET NETWORK USING A BUFFER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of packet communication systems, and in particular, to timing recovery in a packet network using a buffer.

2. Description of the Prior Art

Packet networks include many packet devices that communicate with each other. The packet devices communicate according to a standardized protocol, such as TCP/IP, which transfers data in the form of packets. The packets are transmitted as an electrical signal, an optical signal, a wireless signal, etc., depending on the transport medium between the packet devices. Packet devices in the packet network should be substantially synchronized in order for the packet devices to communicate reliably. For instance, when streaming data is sent over the packet network, the stream of data needs to be played out of the network at the receiving end at the same rate the stream of data was sent into the network at the transmitting end. If this synchronization is not established, the slower end will be overrun with data it must discard and the faster end will become starved for data.

Network operators could synchronize internal clocks of the packet devices by installing very-accurate clocks in each of the packet devices. The accurate clocks do not drift very far from the base, reference frequency from which they are configured to operate. Unfortunately, the accurate clocks are expensive and they increase the total cost of the packet network. Expensive clocks would be impractical to use in wide spread residential packet devices.

The network operators could also synchronize the internal clocks by transmitting a universal clock signal to the packet devices over a physical transport medium. The universal clock signal could come from a universal clock used throughout the packet network. Packet devices in the packet network can recover the universal clock signal from the transport medium. For instance, a packet device can detect and filter out a clock pulse from an electric signal on a copper wire. Recovering a clock signal from a transport medium is well known to those skilled in the art. Unfortunately, the accuracy of the recovered clock signal depends on the quality of the transport medium used to carry the clock signal. Packet devices may not be able to recover an accurate clock signal from a low quality transport medium. For instance, a T1 line may carry a high quality clock signal whereas another type of line may not carry a quality clock signal.

SUMMARY OF THE INVENTION

The invention helps to solve the above problems by using a buffer to recover timing information from packets in a packet network. The recovered timing information is not recovered from the physical signal that carries the packets, but from the higher-level packets themselves. Advantageously, the quality of the timing information is substantially independent from the quality of the transport medium used to transfer the packets. Also, packet devices can use low cost internal clocks and still be substantially synchronized with one another because the packet devices can adjust the low cost internal clocks using the recovered timing information.

One embodiment of the invention comprises a receiver packet communication device that is comprised of a buffer and a synchronization system. The buffer is configured to receive packets wherein the packets were transmitted based on a first timing signal. The buffer is further configured to receive a second timing signal from the synchronization system, and transfer the packets based on the second timing signal.

The synchronization system is configured to determine a measured number of packets in the buffer. The synchronization system is further configured to compare the measured number to a target number to recover timing information. The synchronization system is further configured to adjust the second timing signal based on the timing information. In some examples of the invention, the target number represents the number of packets in the buffer if the second timing signal were substantially synchronized with the first timing signal.

In another embodiment, the buffer is comprised of a jitter portion and a drift portion. The jitter portion is configured to remove jitter from packet transmissions. The synchronization system is configured to use the drift portion to detect drift in the second timing signal. The synchronization system is further configured to recover timing information from the drift portion and adjust the second timing signal based on the timing information to compensate for the drift. For instance, if the measured number is greater than the target number, then the synchronization system increases the rate of the second timing signal based on the timing information. If the measured number is less than the target number, then the synchronization system decreases the rate of the second timing signal based on the timing information.

DETAILED DESCRIPTION OF THE INVENTION

Figure 1:
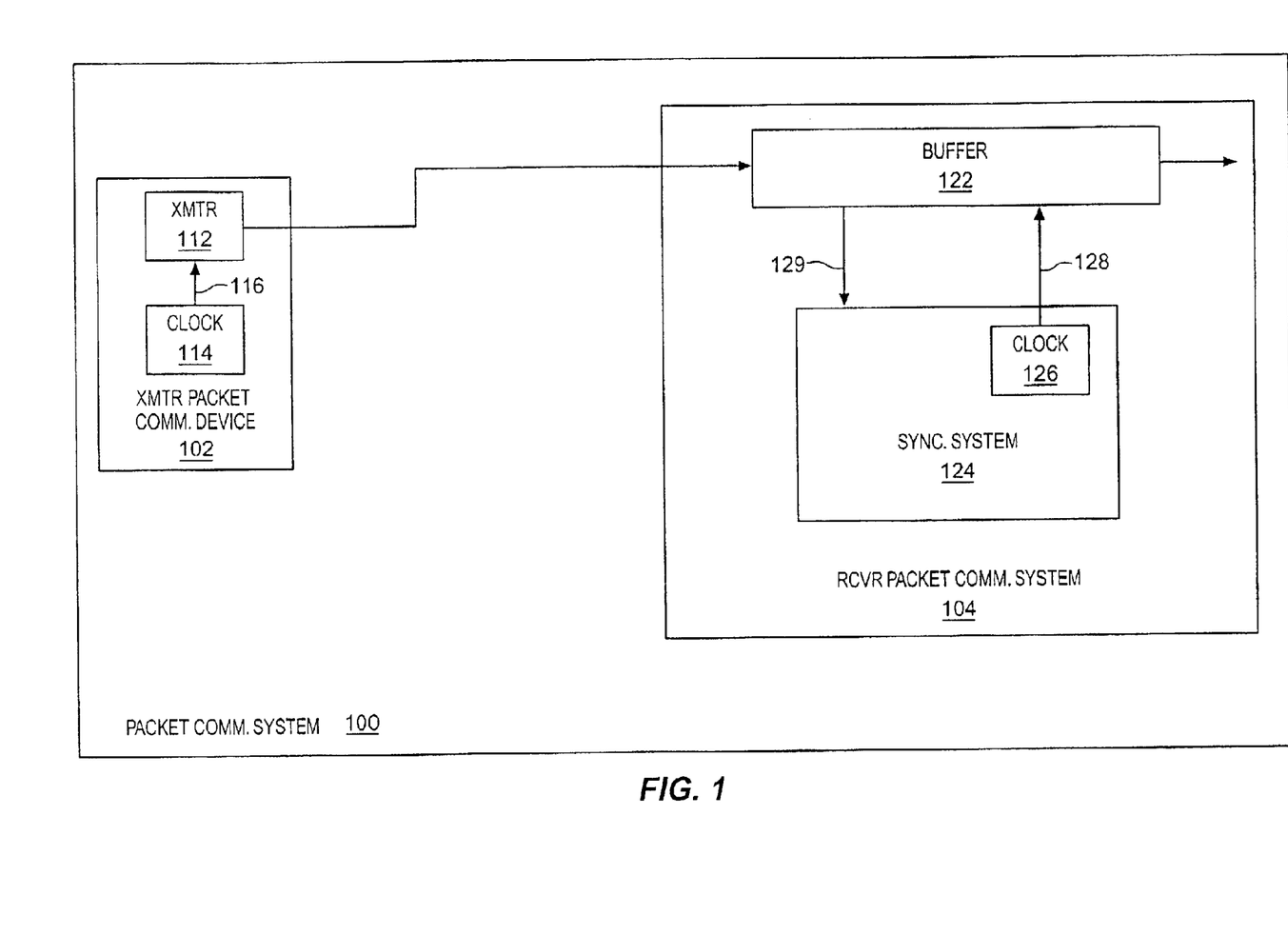
FIG. 1 is a block diagram that illustrates a packet communication system in an example of the invention.

Packet Communication System—FIG. 1

FIG. 1 depicts a specific example of a packet communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 1 have been simplified or omitted for clarity.

FIG. 1 is a block diagram that illustrates a packet communication system 100 in an example of the invention. Packet communication system 100 is comprised of transmitter packet communication device 102 and receiver packet communication device 104. Transmitter packet communication device 102 is comprised of a transmitter 112 and a clock 114. Receiver packet communication device 104 is comprised of a buffer 122 and a synchronization system 124. Synchronization system 124 includes a clock 126. Transmitter packet communication device 102 is configured to communicate with receiver packet communication device 104. Buffer 122 is coupled to synchronization system 124. Those skilled in the art will appreciate that buffer 122 could be a buffer, a queue, or any other device configured to temporarily store packets.

In operation, clock 114 generates a transmitter timing signal 116. Transmitter 112 transmits packets to receiver packet communication device 104 based on the transmitter timing signal 116. Buffer 122 receives and buffers the packets. Clock 126 generates a receiver timing signal 128. Buffer 122 receives the receiver timing signal 128 from synchronization system 124 and transfers the packets based on the receiver timing signal 128.

Synchronization system 124 determines a measured number of the packets in buffer 122. The measured number is represented in FIG. 1 as arrow 129. Synchronization system 124 compares the measured number to a target number to recover timing information. Synchronization system 124 adjusts the receiver timing signal 128 based on the timing information.

In some examples, the target number represents the number of packets in buffer 122 if the receiver timing signal 128 were substantially synchronized with the transmitter timing signal 116. The target number could be a predetermined number that depends on the maximum jitter in a packet network, the amount of time that buffer 122 takes to play out a packet, the amount of time that synchronization system 124 takes to identify drift in the receiver timing signal 128, and other factors. The target number could be determined by looking at specifications of packet devices or could be determined by testing. If the measured number does not equal the target number, then synchronization system 124 recovers the timing information based on the difference between the measured number and the target number. The timing information represents a frequency difference between the transmitter timing signal 116 and the receiver timing signal 128. Synchronization system 124 recovers the timing information to compensate for drift in the receiver timing signal 128 and to substantially synchronize clock 126 with clock 114.

Receiver Packet Communication Device—FIGS. 2–5

FIGS. 2–5 depict a specific example of a configuration and operation of a receiver packet communication device in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 2–5 have been simplified or omitted for clarity.

Figure 2:
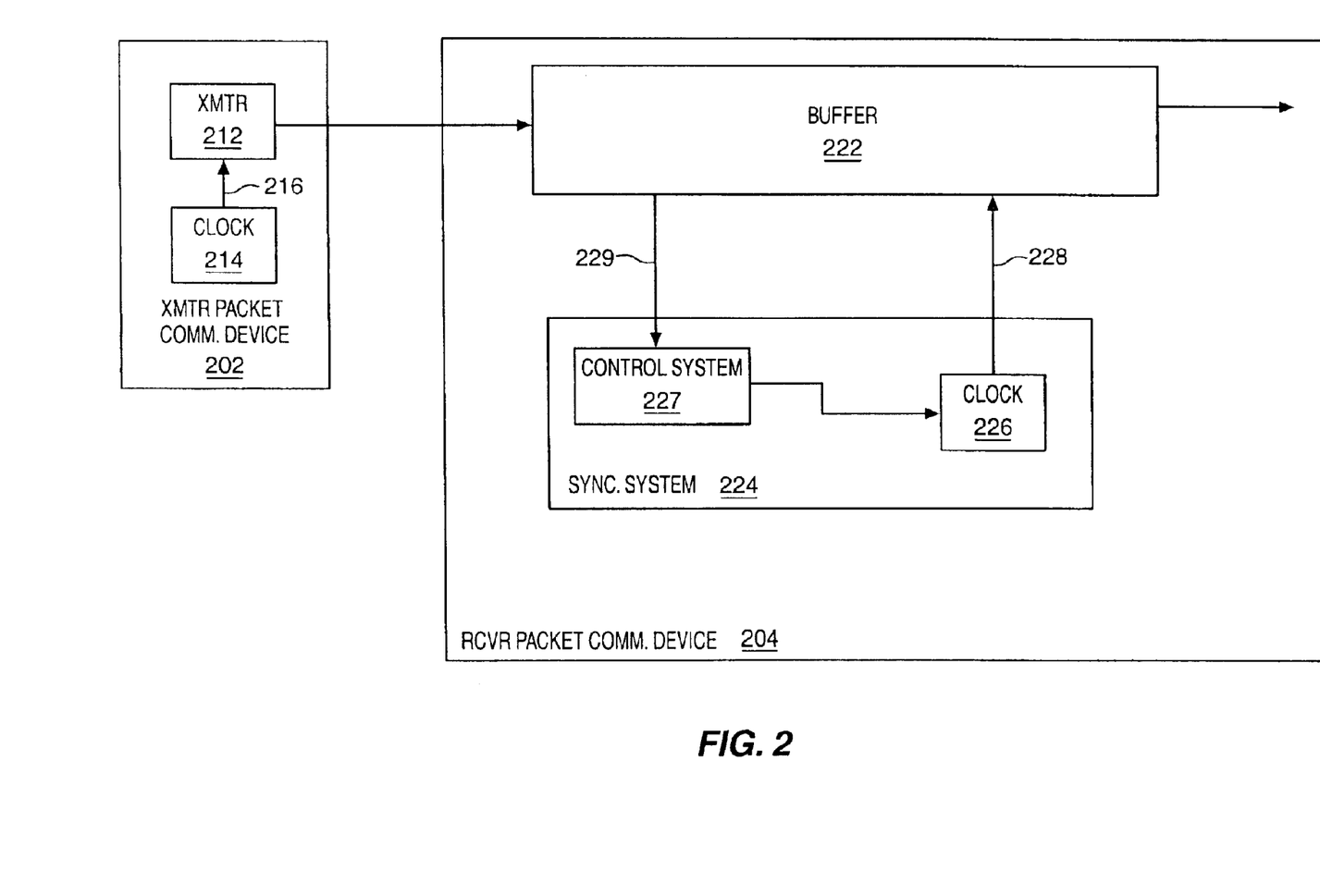
FIG. 2 is a block diagram that illustrates a packet communication device in an example of the invention.

FIG. 2 is a block diagram that illustrates a receiver packet communication device 204 in an example of the invention. Receiver packet communication device 204 is comprised of buffer 222 coupled to synchronization system 224. Synchronization system 224 is comprised of clock 226 and control system 227. Receiver packet communication device 204 could be coupled to a packet network (not shown). The packet network could be a voice-over-packet network. Receiver packet communication device 204 could also be configured to communicate with a transmitter packet communication device 202 that is comprised of transmitter 212 and clock 214. Those skilled in the art will appreciate that receiver packet communication device 204 and transmitter packet communication device 202 could be endpoints. It is assumed that the packets are of fixed length and that transmitter packet communication device 202 transmits the packets at a rate that is within a known set boundary.

In operation, clock 214 generates a transmitter timing signal 216. Transmitter 212 transmits packets based on the transmitter timing signal 216. Buffer 222 receives and buffers the packets. Clock 226 generates a receiver timing signal 228. Buffer 222 receives the receiver timing signal 228 from synchronization system 224. Buffer 222 transfers the packets based on the receiver timing signal 228. In the voice-over-packet example, the timing signal 228 would control the rate of the voice signal.

Figure 3:
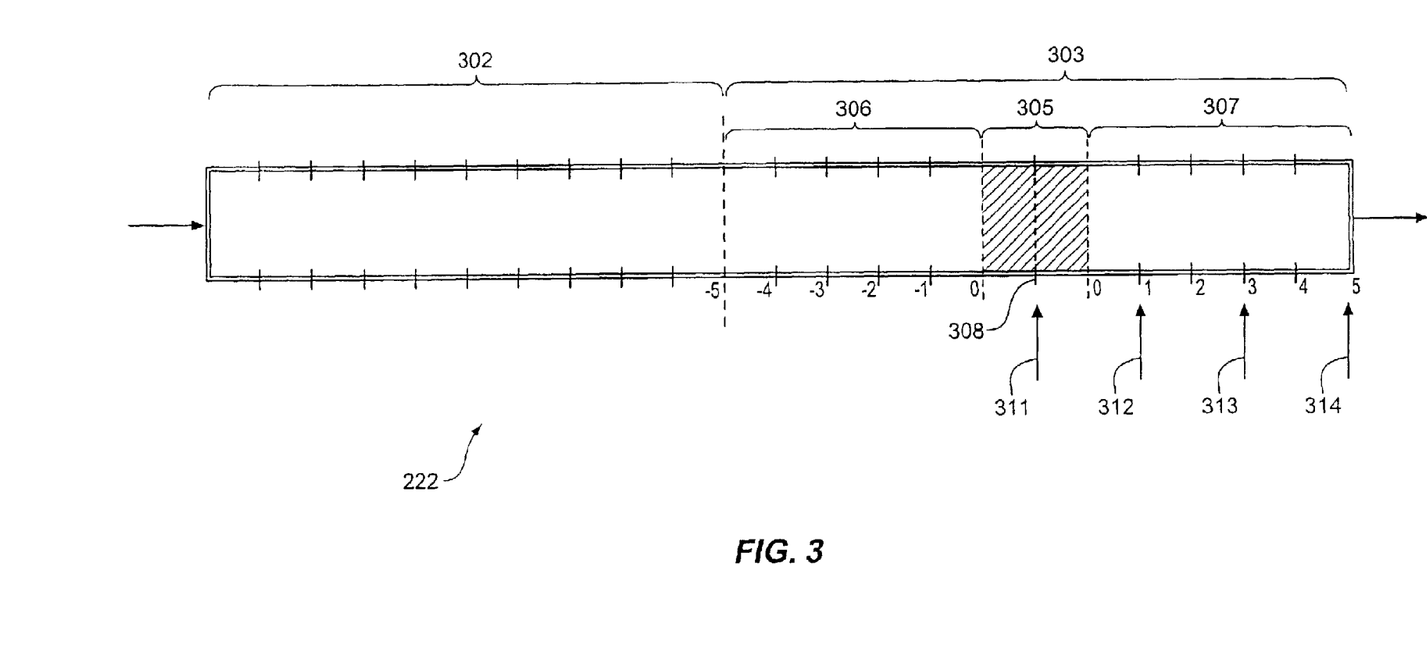
FIG. 3 is a block diagram that illustrates a buffer for jitter and drift compensation in an example of the invention.

FIG. 3 is a block diagram that illustrates buffer 222 in an example of the invention. Buffer 222 receives the packets from the left in FIG. 3 and transfers the packets to the right. Buffer 222 is comprised of a jitter portion 302 and a drift portion 303. The drift portion 303 includes an oscillatory wander portion 305, a first drift measurement portion 306, and a second drift measurement portion 307. Control system 227 is configured to determine a measured number of packets in buffer 222 at any given time. The packets in this example are fixed in length; thus control system 227 can determine the measured number by determining the depth of the packets in buffer 222. The measured number will be referred to in the following paragraphs as the measured depth, which is represented in FIG. 2 as arrow 229.

Control system 227 is also configured to identify a target number of packets in buffer 222. The target number represents the number of packets that control system 227 attempts to maintain in buffer 222. The target number is a predetermined packet depth in buffer 222 if the receiver timing signal 228 is substantially synchronized with the transmitter timing signal 216. Control system 227 can identify the target number as a depth of packets in buffer 222, referred to herein as the target depth 308, because the packets are fixed length.

The size of the jitter portion 302 depends on the maximum burst of jitter that receiver packet communication device 204 could receive from a packet network. Jitter is random increases or decreases in the transmission rate of the packets that average out over time. To determine the size of the jitter portion 302, for example, assume the maximum burst of jitter is 70 ms and buffer 222 takes 10 ms to play out a packet. In such a case, the jitter portion 302 is set to a depth of 70 ms or 7 packets. The jitter portion 302 removes jitter that affects the transmission of the packets.

The size of the drift portion 303, and consequently the size of the first drift measurement portion 306 and the second drift measurement portion 307, depends on the worst case drift of the receiver timing signal 228. Drift is caused by a mismatch of two timing sources. Drift produces a nearly constant rate of either accumulation of too much data resulting in an overflow, or the reduction of available data resulting in data starvation. The drift can be represented as a worst case differential between the transmitter timing signal 216 and the receiver timing signal 228. The size of the first drift measurement portion 306 and the second drift measurement portion 307 are each set to be as deep as the worst case differential. For example, assume the worst case differential is 2 packets in 1 second and the minimum duration to verify the differential is 2 seconds. In such a case, the first drift measurement portion 306 and the second drift measurement portion 307 each need to be at least 4 packets deep.

The size of the drift portion 303 also depends on the oscillatory wander portion 305. The oscillatory wander portion 305 is centered about the target depth 308 of buffer 222. The size of the oscillatory wander portion 305 depends on the maximum allowed oscillation of the receiver timing signal 228 about some reference frequency. For 9 example, assume that the reference frequency of the receiver timing signal 228 is 10 packets/second. The receiver timing signal 228 could oscillate about the reference frequency and vary from 9 packets/second to 11 packets/second. In such a case, the maximum allowed oscillation of the receiver timing signal 228 is +/−1 packet/second. Thus, the size of the oscillatory wander portion 305 would be 2 packets.

Figure 4:
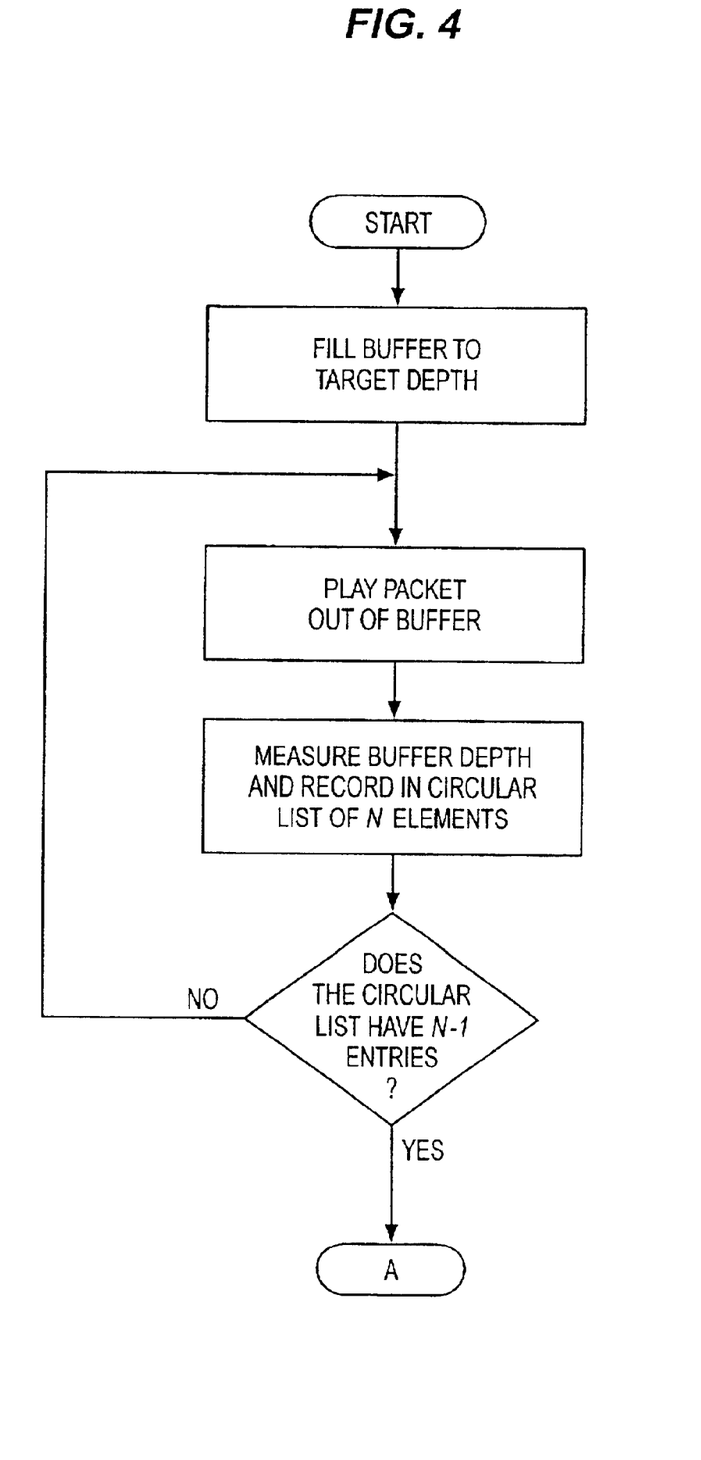
FIG. 4 is a flow diagram that illustrates an operation of a packet communication device in an example of the invention.
Figure 5:
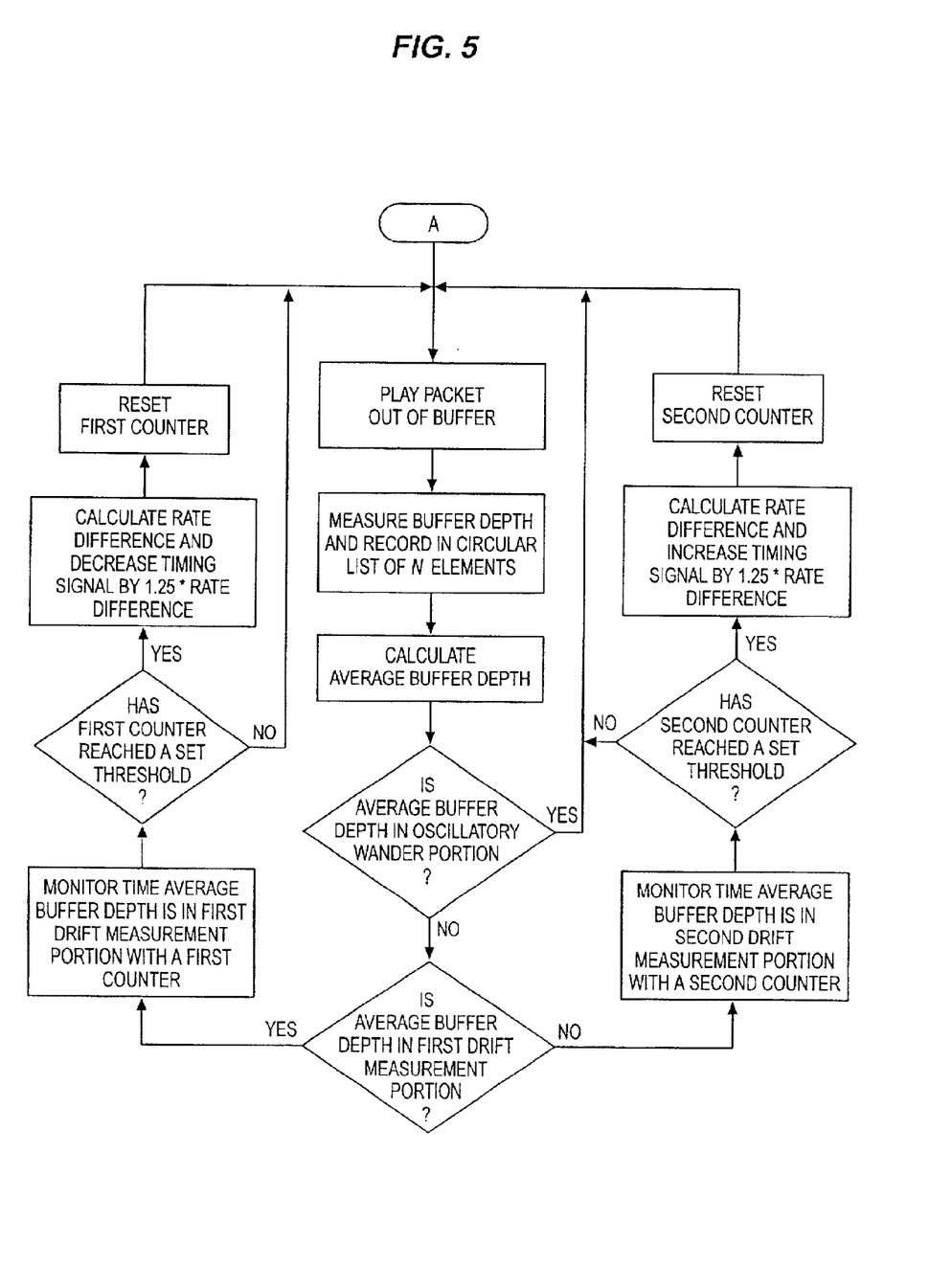
FIG. 5 is a flow diagram that illustrates an operation of a packet communication device in an example of the invention.

Control system 227 uses the drift portion 303 to recover timing information from the packets. If the receiver timing signal 228 drifts relative to the transmitter timing signal 216, then control system 227 uses the timing information to adjust the receiver timing signal 228 to compensate for the drift FIGS. 4–5 are flow diagrams that illustrate an operation of buffer 222 and synchronization system 224. FIG. 4 illustrates a process to initialize buffer 222 and control system 227 for operation. Buffer 222 receives packets and fills to the target depth 308. The target depth 308 in this example is: jitter portion+first drift measurement portion+ 0.5(oscillatory wander portion). Buffer 222 then plays out a packet. Control system 227 determines the measured depth 229 of buffer 222 and records the measured depth 229 in a circular list of N elements. Control system 227 continues to record measured depths in the circular list until the list contains N−1 entries. Buffer 222 and control system 227 are then initiallized.

FIG. 5 illustrates a process to recover timing information and adjust the receiver timing signal 228. To begin the process, buffer 222 plays out a packet. Control system 227 determines the measured depth 229 of buffer 222 and records the measured depth 229 in the circular list. Control system 227 calculates an average buffer depth based on the entries in the circular list. If the average buffer depth is within the oscillatory wander portion 305, then control system 227 begins the process again.

If the average buffer depth is in the first drift measurement portion 306, then control system 227 monitors the time that the average buffer depth is in the first drift measurement portion 306 using a first counter. If the first counter has not reached a set threshold, then control system 227 returns to the start of the process. The set threshold is the amount of time selected for control system 227 to determine if the receiver timing signal 228 has drifted before adjusting the receiver timing signal 228. If the first counter has reached the set threshold, then control system 227 calculates a rate difference (rateDiff). The rate difference represents a time differential between the transmitter timing signal 216 and the receiver timing signal 228. In this example, the rate difference equals the number of packets the average buffer depth is in the first drift measurement portion 306 divided by the first counter. Control system 227 uses a drift algorithm to determine how to adjust the receiver timing signal 228. The drift algorithm, in this example, is 1.25*rateDiff. Control system 227 decreases the receiver timing signal 228 by 1.25*rateDiff. Control system 227 resets the first counter and returns to the start of the process.

If the average buffer depth is in the second drift measurement portion 307, then control system 227 monitors the time that the average buffer depth is in the second drift measurement portion 307 using a second counter. If the second counter has not reached the set threshold, then control system 227 returns to the start of the process. If the second counter has reached the set threshold, then control system 227 calculates the rate difference. In this example, the rate difference equals the number of packets the average buffer depth is in the second drift measurement portion 307 divided by the second counter. Control system 227 uses the drift algorithm to determine how to adjust the receiver timing signal 228. Control system 227 increases the receiver timing signal 228 by 1.25*rateDiff Control system 227 resets the second counter and returns to the start of the process.

Buffer 222 and synchronization system 224 could be used in a rate adaptive mode if the rate changes of the receiver timing signal 228 are infrequent in relation to the time needed for synchronization system 224 to determine drift. This would be established by resetting the counters and recalculating based on the new packet size.

Referring to FIG. 3 for the following example, the first drift measurement portion 306 is labeled from −5 to 0 and the second drift measurement portion 307 is labeled from 0 to 5. These numbers represent the number of packets above or below the oscillatory wander portion 305 based on the average measured depth. Assume for this example that the minimum duration for control system 227 to verify if the receiver timing signal 228 is drifting is 2 seconds. Also, assume that buffer 222 receives the packets at a rate of 10 packets/second, and initially plays the packets out at a rate of 10 packets/second based on the receiver timing signal 228.

At a first time period, control system 227 determines a first measured depth 311. The first measured depth 311 is within the oscillatory wander portion 305, so control system 227 does nothing to the receiver timing signal 228. At a second time period, control system 227 determines a second measured depth 312. The second measured depth 312 is within the second drift measurement portion 307, so control system 227 "sees" that the receiver timing signal 228 may be drifting. Control system 227 then begins to monitor the time that the average measured depth is in the second drift measurement portion 307. The second measured depth 312 is one packet above the oscillatory wander portion 305. At a third time period, control system 227 determines a third measured depth 313. The third measured depth 313 is again within the second drift measurement portion 307, so control system 227 monitors the time that the average measured depth is in the second drift measurement portion 307. At the third time period, we will assume that the time that the average measured depth is in the second drift measurement portion 307 is 1 second. Because the minimum duration for control system 227 to verify whether the receiver timing signal 228 is drifting is 2 seconds, control system 227 does not adjust the receiver timing signal 228.

At a fourth time period, control system 227 determines a fourth measured depth 314. The fourth measured depth 314 is within the second drift measurement portion 307, so control system 227 monitors the time that the average measured depth is in the second drift measurement portion 307. At the fourth time period, we will assume that the time that the average measured depth is in the second drift measurement portion 307 is 2 seconds. After a duration of 2 seconds, control system 227 is able determine that drift of the receiver timing signal 228 is causing the fourth measured depth 314 to be in the second drift measurement portion 307. For this example, control system 227 calculates the rate difference to be 2 packets/second, because over a two-second duration, the measured depth increased from 1 packet above the oscillatory wander portion 305 to 5 packets above. The rate difference represents timing information recovered from the packets. Control system 227 then uses the drift algorithm (1.25*2 packets/second) to adjust clock 226 and the receiver timing signal 228. Control system 227 increases the receiver timing signal 228 by 2.5 packets/ second. Increasing the receiver timing signal 228 should move the average measured depth down toward the target depth 308.

The above-described receiver packet communication device 204 could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Buffer 222 and synchronization system 224 can be used in an environment that is not constant traffic, as long as transmitter packet communication device 202 informs buffer 222 and synchronization system 224 when it has stopped sending packets for a time. Buffer 222 would simply play out all its packets. It would then refill the buffer to the target depth 308 the next time transmitter packet communication device 202 begins transmitting packets again. This would still require transmitter packet communication device 202 to transmit the packets at a rate within known parameters when it does transmit the packets.

Receiver packet communication device 204 could be used in the following exemplary applications. In an environment in which all masters and slaves of a packet network are known in advance, the masters would always be providing clock signals to the slaves, wherein the slaves would be using a buffer and drift algorithm to recover timing information.

In an environment in which endpoints are known, but master and slave status is not defined, the endpoints would communicate via control packets to establish which endpoint had the better reference clock. The endpoint with the better reference clock would then run off of its internal clock and the other endpoints would synchronize to that clock using a buffer and drift algorithm.

In an environment in which endpoints are unknown, if a first endpoint, that is using a buffer and drift algorithm, does not receive a response from a second endpoint, the first endpoint assumes that the second endpoint is not using a buffer and drift algorithm. Therefore, the first endpoint synchronizes to the second endpoint using the buffer and the drift algorithm.

In an asynchronous network where no communication is needed between endpoints, the rate at which the data is read out of a buffer of a first endpoint will be based on a drift algorithm. The rate at which data is sent back to a second endpoint would be based on the internal clock of the first endpoint. This could result in slips if the second endpoint is not using a buffer and drift algorithm to recover timing information.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a receiver packet communication device, the method comprising:

receiving packets in a buffer wherein the packets were transmitted based on a first timing signal;

generating a second timing signal and transferring the packets out of the buffer based on the second timing signal;

determining a measured number of the packets in the buffer, comparing the measured number to a target number to recover timing information, wherein the target number represents a predetermined number of the packets in the buffer if the second timing signal was substantially synchronized with the first timing signal; and adjusting the second timing signal based on the timing information.

2. The method of claim 1 further comprising:

recording the measured number in a list;

calculating an average measured number based on entries in the list; and comparing the average measured number to the target number to recover the timing information.

3. The method of claim 2 further comprising increasing the second timing signal if the average measured number is greater than the target number.

4. The method of claim 2 further comprising decreasing the second timing signal if the average measured number is less than the target number.

5. The method of claim 1 wherein the timing information represents a frequency difference between the first timing signal and the second timing signal.

6. The method of claim 1 further comprising adjusting the second timing signal based on the timing information to compensate for drift in the second timing signal.

7. The method of claim 1 further comprising buffering the packets in the buffer to compensate for jitter.

8. A receiver packet communication device, comprising:

a buffer configured to receive and buffer packets wherein the packets were transmitted based on a first timing signal, receive a second timing signal, and transfer the packets based on the second timing signal; and a synchronization system coupled to the buffer and configured to generate the second timing signal, transfer the second timing signal to the buffer, determine a measured number of the packets in the buffer, compare the measured number to a target number to recover timing information wherein the target number represents a predetermined number of the packets in the buffer if the second timing signal was substantially synchronized with the first timing signal, and adjust the second timing signal based on the timing information.

9. The receiver packet communication device of claim 8 wherein the synchronization system is further configured to record the measured number in a list, calculate an average measured number based on entries in the list, and compare the average measured number to the target number to recover the timing information.

10. The receiver packet communication device of claim 9 wherein the synchronization system is further configured to increase the second timing signal if the average measured number is greater than the target number.

11. The receiver packet communication device of claim 9 wherein the synchronization system is further configured to decrease the second timing signal if the average measured number is less than the target number.

12. The receiver packet communication device of claim 8 wherein the timing information represents a frequency difference between the first timing signal and the second timing signal.

13. The receiver packet communication device of claim 8 wherein the synchronization system is further configured to adjust the second timing signal based on the timing information to compensate for drift in the second timing signal.

14. The receiver packet communication device of claim 8 wherein the buffer is further configured to buffer the packets to compensate for jitter.

15. A packet communication system, comprising:
a transmitter packet communication device configured to transmit packets based on a first timing signal; and
a receiver packet communication device configured to receive and buffer the packets in a buffer, generate a second timing signal, transfer the packets out of the buffer based on the second timing signal, determine a measured number of the packets in the buffer, compare the measured number to a target number to recover timing information wherein the target number represents a predetermined number of the packets in the buffer if the second timing signal was substantially synchronized with the first timing signal, and adjust the second timing signal based on the timing information.

16. The packet communication system of claim 15 wherein the receiver packet communication device is further configured to record the measured number in a list, calculate an average measured number based on entries in the list, and compare the average measured number to the target number to recover the timing information.

17. The packet communication system of claim 16 wherein the receiver packet communication device is further configured to increase the second timing signal if the average measured number is greater than the target number.

18. The packet communication system of claim 16 wherein the receiver packet communication device is further configured to decrease the second timing signal if the average measured number is less than the target number.

19. The packet communication system of claim 15 wherein the timing information represents a frequency difference between the first timing signal and the second timing signal.

20. The packet communication system of claim 15 wherein the receiver packet communication device is further configured to adjust the second timing signal to compensate for drift in the second timing signal.

21. The packet communication system of claim 15 wherein the receiver packet communication device is further configured to buffer the packets in the buffer to compensate for jitter.

22. A software product for recovering timing information in a packet network, comprising:
receiver packet communication device software operational when executed by a processor to direct the processor to receive and buffer packets in a buffer wherein the packets were transmitted based on a first timing signal, receive a second timing signal, transfer the packets based on the second timing signal, determine a measured number of the packets in the buffer, compare the measured number to a target number to recover timing information wherein the target number represents a predetermined number of the packets in the buffer if the second timing signal was substantially synchronized with the first timing signal, and adjust the second timing signal based on the timing information; and
a software storage medium configured to store the receiver packet communication device software.

23. The software product of claim 22 wherein the receiver packet communication device software further directs the processor to adjust the second timing signal based on the timing information to compensate for drift in the second timing signal.

24. The software product of claim 22 wherein the receiver packet communication device software further directs the processor to buffer the packets to compensate for jitter.

* * * * *